United States Patent [19]

Saladini et al.

[11] 4,165,390

[45] Aug. 21, 1979

[54] PROCESS FOR SOLUBILIZING FD&C RED #3 UNDER ACIDIC CONDITIONS AND COMPOSITION

[75] Inventors: Joseph J. Saladini, Dover, Del.; John V. Parnell, III, Larchmont, N.Y.; Wayne L. Steensen, Newark; Harry H. Topalian, Dover, both of Del.

[73] Assignee: General Foods Corporation, White Plains, N.Y.

[21] Appl. No.: 828,570

[22] Filed: Aug. 29, 1977

[51] Int. Cl.$^2$ ................................................ A23L 1/27
[52] U.S. Cl. ..................................... 426/540; 426/250; 426/573; 8/93
[58] Field of Search .................. 426/250, 540, 573; 8/93

[56] References Cited

U.S. PATENT DOCUMENTS

| | | | |
|---|---|---|---|
| 2,535,538 | 12/1950 | Koch ..................................... | 426/540 |
| 3,347,682 | 10/1967 | Rosenstein et al. ................... | 426/576 |
| 3,483,002 | 12/1969 | Stein ...................................... | 426/250 |
| 3,511,667 | 5/1970 | Schramm et al. ..................... | 426/250 |
| 3,934,973 | 1/1976 | Shultz .................................... | 8/79 |

*Primary Examiner*—Raymond N. Jones
*Assistant Examiner*—Elizabeth A. Hatcher
*Attorney, Agent, or Firm*—Bruno P Struzzi; Thomas V. Sullivan; Mitchell D. Bittman

[57] ABSTRACT

FD&C Red #3 is solubilized under acidic conditions to provide a substantially cloud-free and precipitate-free product by dispersing the Red #3 in a solvent having a pH above about 4.5, fixing the Red #3 with a substrate, and solubilizing the fixed Red #3 into an aqueous solution in the presence of an amount of gelatin and for a period of time effective to stabilize the Red #3 in an aqueous solution below the pH of about 4.5, and adjusting the pH of the aqueous solution below about 4.5.

16 Claims, No Drawings

PROCESS FOR SOLUBILIZING FD&C RED #3 UNDER ACIDIC CONDITIONS AND COMPOSITION

BACKGROUND

FD&C Red #3 (erythrosine, principally the monohydrate of 9(O-carboxyphenyl)-6-hydroxy-2,4,5,7-tetraiodo-3H-xanthen-3-one, disodium salt, with smaller amounts of lower iodinated fluoresceins) has long been known in the art to be generally insoluble (precipitates, cloudy, etc.) at low pH's, i.e., below pH of about 4.5. When Red #3 was added to such low pH products the general result was a cloudy, and turbid product with precipitation as well.

SUMMARY

Briefly, this invention involves dispersing Red #3 in a solvent having a pH above about 4.5 wherein at least a majority of the Red #3 by weight dissolves in the solvent, followed by fixing the Red #3 with a substrate, and then solubilizing the fixed Red #3 into an aqueous solution in the presence of an amount of gelatin and for a period of time effective to stabilize the Red #3 in solution and to provide a solution wherein substantial clouding or precipitation by the Red #3 is prevented, and adjusting the pH of the aqueous solution to below about 4.5.

An FD&C Red #3 composition which is substantially cloud-free and precipitate-free when solubilized in a solution having a pH below about 4.5 can be prepared containing Red #3 fixed with a substrate and an amount of gelatin effective to stabilize the Red #3 when in an acidic (below pH of about 4.5) aqueous solution.

DETAILED DESCRIPTION OF THE INVENTION

The process for solubilizing Red #3 under acidic conditions first involves dispersing the Red #3 in a solvent, the solvent having a pH above about 4.5. The type of solvent chosen being compatible with the Red #3 in that no adverse reaction takes place with the Red #3 and a sufficient amount of Red #3 can be dispersed in the solvent to make the process economically feasible. The type of solvent also being compatible with the substrate and with the manner in which the Red #3 is to be fixed with the substrate. Suitable solvents include water, glycerine, propylene glycol, ethanol, etc. Preferably, a base (e.g., sodium hydroxide or a food grade alkaline buffer salt such as trisodium citrate, tripotassium citrate, disodium phosphate etc.) can be added to the solvent to maintain a pH above about 4.5 and to allow more Red #3 to be solubilized. Preferably, the solvent is maintained within a pH range of about 6–10 and optimally within a pH range of about 6–8. The base used may be of any type which does not interfere with the Red #3 solubilization or complex the Red #3 and precipitate it out of solution.

Optimally the best results are obtained when the Red #3 is substantially completely dissolved (solubilized) in the solvent. However, slurries wherein at least a majority by weight of the Red #3 is in solution also provides adequate results although ultimately when the fixed Red #3 is solubilized under acid conditions in the presence of an effective amount of gelatin, a slight and insubstantial haze may be observed in the Red #3 acidic solution. Preferably the solvent is heated (e.g. to above 60° C.) to increase the amount of Red #3 that will dissolve in the solvent although lower temperatures are also adequate.

When the terms "solubilizing" or "dissolving" Red #3 in a solvent or solution are used what is meant is that either the Red #3 has entered into a stable dispersion wherein individual particles of Red #3 are not readily observable and wherein there is substantially no cloud, haze or precipitate in the resultant solution, or where the Red #3 is in fact dispersed on a molecular scale.

Second the Red #3 is fixed with a substrate. By fixing is meant that the Red #3 dispersion is dispersed onto or in a substrate by either plating the Red #3 dispersion onto the substrate followed by drying, or dissolving the substrate into solution with the Red #3 followed by co-drying (e.g. spray drying, air drying, drum drying, freeze drying etc.) the Red #3 -substrate solution. The substrate (carrier) employed should be readily soluble in an aqueous solution, should be compatible with the ultimate desired product and should be present in at least an amount effective to disperse the Red #3 in aqueous solution. Preferably less than 25% by weight of Red #3 is fixed with a substrate although higher percentages of Red #3 can be employed depending upon the substrate, the manner of fixing the Red #3 with a substrate, the particle size of the substrate-fixed Red #3, as well as the desired color intensity of the ultimate Red #3 acidic solution. The type of substrate employed must also be compatible with the method chosen of fixing the Red #3 dispersion. For example, generally gelatin as a substrate would not be compatible to fixing the Red #3 dispersion by plating due to the hygroscopic nature of gelatin. Suitable substrates would include starches, dextrins, sugars (e.g., sucrose, dextrose, lactose), milk solids, gelatins, gums and other hydrocolloids, buffer salts (e.g., trisodium citrate, tripotassium citrate), etc.

Preferably the substrate-fixed Red #3 is ground to a smaller particle size. It has been found that generally the smaller the particle size of the substrate-fixed Red #3 the higher the percentage of Red #3 that can be added to and fixed with a substrate and that will still provide a substantially cloud-free and precipitate-free Red #3 acidic solution without excessive mixing of such solution (e.g. mixing over two minutes). For example, using a gelatin as the substrate and a mixing time of two minutes, when the gelatin-fixed Red #3 is ground to a size wherein the granules pass through a 50 mesh U.S. Standard Screen then up to about 25% by weight of Red #3 can be fixed with the gelatin, when the granules pass through a 100 mesh U.S. Standard Screen then up to 25–30% by weight of Red #3 can be fixed with the gelatin and when the granules pass through a 400 mesh U.S. Standard Screen then up to 45–50% by weight of Red #3 can be fixed with the gelatin. The fixation pH and bloom strength of the gelatin may modify these ranges.

The Red #3 when fixed with a substrate can be combined with an effective amount of gelatin to provide a dry Red #3 composition which when solubilized in an aqueous solution whose pH is adjusted to below about 4.5, results in solution which is substantially cloud-free and precipitate-free. Preferably the substrate is also a gelatin. When the Red #3 is fixed with the substrate it is preferably in a state wherein the Red #3 is molecularly dispersed onto or within the substrate.

Preferably the Red #3 is fixed with the substrate by dissolving the substrate into solution with the Red #3 followed by co-drying. The resultant substrate-fixed Red #3 is found to have excellent storage stability in that the Red #3 by being fixed within the substrate is protected from exposure to other added concentrate ingredients such as edible acids (e.g., citric, malic, fumaric, lactic and adipic acids etc.), which may cause color deterioration.

Third the fixed Red #3 is then solubilized into an aqueous solution in the presence of an amount of gelatin and for a period of time effective to stabilize the Red #3 when in an aqueous solution below the pH of about 4.5 and provide a cloud-free and precipitate-free solution, and adjusting the pH of the aqueous solution to below 4.5. It is hypothesized that the gelatin is able to tie up Red #3 reaction sites thus preventing the Red #3 from reacting with the acid to make it insoluble. An effective amount of gelatin must be allowed to enter into solution and interact with the Red #3 to stabilize it, prior to allowing an amount of acid (or acid and buffer) to enter into solution which will react with the Red #3 to make it insoluble resulting in a precipitate and a cloudy solution. This can be accomplished a number of ways. First, the acid or acid buffer system can be added to the aqueous solution to adjust the pH after an effective amount of gelatin and the Red #3 have been dissolved in solution. Second, when the Red #3 is fixed with a substrate, it can be fixed with an amount of gelatin effective to stabilize the Red #3 when in an aqueous solution below the pH of about 4.5. Third, when the acid is to be added to an aqueous solution along the gelatin and Red #3, the acid employed can be a slow dissolving acid (e.g., fumaric acid, adipic acid, etc.) or the gelatin employed can be fast dissolving (e.g., gelatin hydrolysate, specially dried gelatins etc.), which will allow an effective amount of gelatin to dissolve into solution to stabilize the Red #3 prior to a sufficient amount of acid dissolving into solution which would react with the Red #3 to make it insoluble (cloudy, precipitate).

All types of gelatin will work whether derived from cow or pig, whether ionized or deionized, whether obtained by vigorous or mild extraction methods, by acid or alkaline hydrolysis etc. The full range of gelatins with regard to bloom will also work, i.e., from 0 Bloom (no gel strength) to 350 Bloom (very high gel strength). Various gelatins work more efficiently than others in that less gelatin is needed to obtain a substantially clear and precipitate-free Red #3 acidic solution. For example, when solubilizing 70 milligrams of Red #3, which had been fixed at a level of 1% on sugar crystals, in 474 ml of an aqueous solution at a pH of about 4.0, either 3 grams of 0 (AOAC) Bloom gelatin (base-processed), or 7 grams of 55 (AOAC) Bloom gelatin (base-processed, or 0.7 grams of 300 (AOAC) Bloom gelatin (deionized, acid processed) is needed to obtain a substantially clear and precipitate-free Red #3 acidic solution. Further, if the Red #3 is fixed with an amount of gelatin effective to stabilize the Red #3 in acidic solution then extra gelatin need not be added to the aqueous solution when solubilizing the fixed Red #3 and adjusting the pH of the aqueous solution to below about 4.5. In order to be able to dissolve the gelatin in solution some gelatins (e.g., high bloom gelatins) may require hot (e.g. 40°–100° C.) water temperatures while others (e.g. gelatin hydrolysate, or specially dried gelatins etc.) may be cold water soluble (e.g. less than 40° C.).

The instant invention is applicable to final products such as dessert gels or puddings as well as sauces, toppings and beverages and can be used in combination with other colors, whether natural or artificial, to obtain a desirable coloring.

EXAMPLE I

FD&C Red #3 (96% dye purity) at a level of 250 grams was dissolved in 1375 ml of tap water at 66° C. and at a pH within about 6–8. The Red #3 solution was mixed into a solution of 2250 grams of 240 (AOAC) Bloom gelatin dissolved in 6750 ml tap water at 66° C. The combined solution at a pH within about 6–8 was maintained at 60°–71° C. while stirring to completely mix the two solutions together, followed by pouring the combined solution into a flat plate, and cooling at 4°–10° C. until firmly gelled. The gel was comminuted in a meat type (hamburger) grinder to increase the surface area, spread on polyethylene lined trays and dried until brittle (approximately 10% moisture) in a forced air dryer at ambient temperatures of approximately 21°–27° C. The dried product was ground in a hammer mill and screened through a 50 mesh U.S. Standard Screen. The screened product at a level of 0.70 grams was mixed into a dry gelatin dessert mix comprising 7.22 grams of 240 (AOAC) Bloom gelatin, 74.07 grams of sugar, 2.27 grams of a food acid (adipic and fumaric acid), 0.60 grams of a buffer salt and 0.19 grams of flavor.

The gelatin dessert was prepared by placing the dry gelatin dessert mix (net weight 85.05 grams) in a bowl, adding 237 ml of boiling water, stirring for two minutes, then adding 237 ml of cold tap water and stirring 20 seconds, followed by chilling at 4°–10° C. until the dessert had gelled. The resultant gelatin dessert had a pH of about 4.0 and was clear and precipitate-free.

EXAMPLE II

FD&C Red #3 (94% dye purity) at a level of 13.6 kilograms was dissolved into 252 liters of water at 71° C. and at a pH within about 6–8. The Red #3 solution was thoroughly mixed into a solution of 112 kilograms of gelatin hydrolysate (0 Bloom) dissolved in 236 liters of water heated to 71° C. The combined solution, at a pH of about 6–8, was then spray dired in a spray dryer operated at about 100° C. outlet temperature, 240° C. inlet temperature and 175 kg/sq. cm. spraying pressure.

The spray dried product was combined with the ingredients of a dry beverage mix powder in the following proportions:

|  | % |
| --- | --- |
| Sugar | 96.49 |
| Food Acid (citric acid) | 1.85 |
| Buffer | 1.55 |
| Flavor | 0.03 |
| Spray Dried Red #3-Gelatin | 0.08 |
| Fixed Product | 100.00 |

The beverage was prepared by mixing 190 grams of the dry beverage mix powder with 1900 milliliters of tap water at 10° C.

The resultant beverage had a pH of 3.0 and exhibited a clear and precipitate-free red solution which remained clear and precipitate-free for 2 days under refrigeration at 7°–10° C.

EXAMPLE III

FD&C Red #3 (96% dye purity) at a level of 19.8 grams was dissolved in 108 ml of tap water at 60°–66° C. and at a pH within about 6–8. The solution is maintained at 60°–66° C. and added in small increments to 2000 grams of sugar in a coating kettle. Each added increment of solution was allowed to dry sufficiently to keep the sugar free-flowing before adding the successive increment.

The dried product was then added to the following ingredients of a dry gelatin dessert mix:

| | Grams |
|---|---|
| Sugar | 67.07 |
| 215(AOAC) Bloom Gelatin | 7.85 |
| Food Acid (adipic & fumaric acid) | 2.27 |
| Buffer | 0.60 |
| Flavor | 0.19 |
| Red #3 - Sugar Fixed Product | 7.07 |
| | 85.05 |

The gelatin dessert was prepared by dissolving the dry gelatin dessert mix (net weight 85.05 grams) into 237 ml of boiling water, stirring to dissolve the dessert mix, then adding 237 ml of cold water, stirring to thoroughly blend, followed by chilling at 4°–10° C. to allow the gel to set. The resulting gelatin dessert had a pH of about 4.0 and contained no precipitate and was essentially clear with only very slight, insubstantial haze apparent.

EXAMPLE IV

FD&C Red #3 (96 Dye Purity) at a level of 25 grams was dissolved in 1371 ml of distilled water at 66° C. and at a pH within about 6–8. The Red #3 solution was mixed into a solution of 75 grams of 240 (AOAC) Bloom gelatin dissolved in 206.25 ml of water and 18.75 ml of 1N NaOH, at 66° C. The combined solution had a pH of 7.5 and was mixed until uniform, then poured into flat pans and cooled at 4°–10° C. until firmly gelled. The gelled material was comminuted and dryed in a forced air dryer at ambient temperatures. The dried material was ground and sifted through a 100 mesh U.S. Standard Screen. The sifted product was combined at a level of 0.28 grams with a dry gelatin dessert mix comprising 74.07 grams of sugar, 7.64 grams of 240 (AOAC) Bloom gelatin, 2.27 grams of a food acid (adipic and fumaric acid), 0.6 grams of a buffer and 0.19 grams of flavor, and thoroughly mixed together.

The gelatin dessert was prepared by adding 237 ml of boiling water to the dry gelatin dessert mix (net weight 85.05 grams) in a bowl, mixing for two minutes, adding 237 ml of cold water and mixing until thoroughly blended, followed by chilling at 4°–10° C. until the dessert had gelled. The resultant gelatin dessert had a pH of about 4.0, did not have any precipitate and was clear.

EXAMPLE V

A dry gelatin dessert mix of the following composition was prepared:

| | Grams |
|---|---|
| Sugar | 74.07 |
| 240 (AOAC) Bloom Gelatin | 7.85 |
| Food Acid (adipic and fumaric acid) | 2.27 |
| Buffer | 0.60 |
| Flavor | 0.19 |
| FD&C Red #3 Powder (96% dye purity, finely ground dye, 85% passing through 200 mesh U.S. Standard Screen) | 0.07 |
| | 85.05 grams |

The ingredients were thoroughly blended. The gelatin dessert was prepared by adding 237 ml of boiling water to the dry gelatin dessert mix (net weight 85.05 grams) in a bowl, mixing for 2 minutes, adding 237 ml of cold water and mixing for two minutes, followed by chilling at 4°–10° C. until the dessert had gelled. The resultant gelatin dessert had a pH of about 4.0, was hazy and cloudy with red insolubles at the bottom of the bowl.

EXAMPLE VI

FD&C Red #3 at a level of 218 grams and food grade trisodium citrate at a level of 1.53 Kg and 1.88 Kg of sugar were dissolved into 14.5 liters of water at 65° C. and at a pH within about 6–8. The solution was then spray dried in a spray dryer operated at about 90° C. outlet temperature, 150° C. inlet temperature and 55 Kg/sq. cm. spraying pressure.

The spray dried product was combined with the ingredients of a dry gelatin dessert mix as follows:

| | Grams |
|---|---|
| Sugar | 73.32 |
| 240 (AOAC) Bloom Gelatin | 7.85 |
| Food Acid (adipic and fumaric acid) | 2.27 |
| Buffer | 0.25 |
| Flavor | 0.19 |
| Spray Dried Fixed Product | 1.17 |
| | 85.05 |

The gelatin dessert was prepared by placing the dry gelatin dessert mix (net weight 85.05 grams) in a bowl, adding 237 ml of boiling water, stirring for two minutes, then adding 237 ml of cold tap water and stirring 20 seconds, followed by chilling at 4°–10° C. until the dessert had gelled. The resultant gelatin dessert had a pH of about 4.0 and was clear and precipitate-free.

What is claimed is:

1. A process for solubilizing FD&C Red #3 under acidic conditions comprising:
   dispersing the Red #3 in a solvent having a pH above about 4.5 wherein at least a majority of the Red #3 by weight is dissolved in the solvent;
   then fixing the Red #3 with a substrate;
   solubilizing the fixed Red #3 into an aqueous solution in the presence of an amount of gelatin and for a period of time effective to stabilize the Red #3 when said Red #3 is in an aqueous solution below the pH of about 4.5 and provide a substantially cloud-free and precipitate free aqueous solution; and adjusting the pH of the aqueous solution to below about 4.5.

2. Process of claim 1 wherein the Red #3 is fixed with a substrate by plating the Red #3 dispersion onto a substrate followed by drying.

3. Process of claim 1 wherein the Red #3 is fixed with a substrate by dissolving the substrate into solution with the Red #3 followed by drying the Red #3-substrate solution.

4. Process of claim 3 wherein the Red #3 -substrate solution is dried by spray-drying.

5. Process of claim 3 wherein the Red #3 -substrate solution is dried by air-drying.

6. Process of claim 1 wherein a base is added to the solvent prior to fixing the Red #3 with a substrate to adjust the Red #3 dispersion to a pH of about 6-10.

7. Process of claim 6 wherein the Red #3 dispersion is adjusted to a pH of about 6-8.

8. Process of claim 3 wherein the substrate is a gelatin.

9. Process of claim 1 wherein upon dispersing the Red #3 in the solvent, the Red #3 is substantially completely dissolved.

10. Process of claim 1 further comprising heating the Red #3 dispersion prior to fixing with a substrate.

11. Process of claim 1 further comprising grinding the substrate-fixed Red #3.

12. Process of claim 11 wherein the substrate-fixed Red #3 is ground to a size wherein the particles pass through a 50 mesh U.S. Standard Screen.

13. Process of claim 1 wherein the solvent is water

14. The product prepared by the process of claim 1.

15. Process of claim 1 wherein the gelatin is obtained by acid hydrolysis.

16. Process of claim 1 wherein the pH of the aqueous solution is adjusted to below about 4.5 by addition of an edible acid chosen from the group consisting of fumaric acid, adipic acid or mixtures thereof.

* * * * *